(12) United States Patent
Ishibashi

(10) Patent No.: US 10,033,950 B2
(45) Date of Patent: Jul. 24, 2018

(54) APPARATUS AND METHOD FOR CONTROLLING A FOCUS DETECTABLE IMAGE SENSOR

(71) Applicant: SAMSUNG ELECTRONICS CO., LTD., Suwon-si, Gyeonggi-do (KR)

(72) Inventor: Kenji Ishibashi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 14/561,574

(22) Filed: Dec. 5, 2014

(65) Prior Publication Data
US 2015/0163434 A1    Jun. 11, 2015

(30) Foreign Application Priority Data
Dec. 10, 2013 (KR) .................. 10-2013-0153310

(51) Int. Cl.
| | |
|---|---|
| H04N 5/378 | (2011.01) |
| H04N 5/232 | (2006.01) |
| G02B 7/34 | (2006.01) |
| H04N 5/235 | (2006.01) |
| H04N 5/353 | (2011.01) |

(Continued)

(52) U.S. Cl.
CPC ............ *H04N 5/378* (2013.01); *G02B 7/34* (2013.01); *H04N 5/2353* (2013.01); *H04N 5/23212* (2013.01); *H04N 5/23293* (2013.01); *H04N 5/3535* (2013.01); *H04N 5/3696* (2013.01); *H04N 9/045* (2013.01)

(58) Field of Classification Search
None
See application file for complete search history.

(56) References Cited

U.S. PATENT DOCUMENTS

| | | | |
|---|---|---|---|
| 2008/0074534 A1* | 3/2008 | Kusaka | ............ H04N 5/23212 348/364 |
| 2009/0278966 A1* | 11/2009 | Kusaka | .................. G02B 7/36 348/294 |

(Continued)

FOREIGN PATENT DOCUMENTS

| | | |
|---|---|---|
| JP | 2008-085535 A | 4/2008 |
| JP | 2010-219958 A | 9/2010 |
| JP | 2012-238951 A | 12/2012 |

OTHER PUBLICATIONS

Extended European Search Report issued for EP 14196779.4 (dated Mar. 11, 2015).

*Primary Examiner* — Edemio Navas, Jr.
(74) *Attorney, Agent, or Firm* — Drinker Biddle & Reath LLP

(57) ABSTRACT

An image sensor control device includes an image sensor including focus detecting pixels; an object brightness detecting unit that detects brightness of an object; a mode determining unit that determines a first readout mode or a second readout mode based on the detected brightness of the object; a read-out unit that reads out the focus detecting pixels in the determined readout mode; and a focus detecting unit that performs focus detection by using focus detection data read out from the focus detecting pixels. In an implementation, in the first readout mode, the read-out unit reads out the focus detecting pixels in a first interval, and, in the second readout mode, the read-out unit reads out the focus detecting pixels in a second interval, which is longer than the first interval.

12 Claims, 14 Drawing Sheets

(51) Int. Cl.
*H04N 5/369* (2011.01)
*H04N 9/04* (2006.01)

(56) References Cited

U.S. PATENT DOCUMENTS

| | | |
|---|---|---|
| 2010/0177236 A1 | 7/2010 | Suzuki et al. |
| 2010/0220217 A1* | 9/2010 | Yuyama ................. G02B 7/36 348/234 |
| 2011/0285899 A1 | 11/2011 | Hirose |
| 2012/0038810 A1 | 2/2012 | Taniguchi |
| 2013/0050538 A1* | 2/2013 | Okubo ................. H04N 5/2355 348/241 |
| 2013/0258155 A1* | 10/2013 | Ueda ........................ H04N 5/21 348/308 |
| 2013/0265295 A1* | 10/2013 | Ogawa ................... G09G 5/003 345/214 |
| 2013/0308040 A1 | 11/2013 | Ishii |

\* cited by examiner

APPARATUS AND METHOD FOR CONTROLLING A FOCUS DETECTABLE IMAGE SENSOR

CROSS-REFERENCE TO RELATED APPLICATIONS

This application claims the priority benefit of Korean Patent Application No. 10-2013-0153310, filed on Dec. 10, 2013, in the Korean Intellectual Property Office, the disclosure of which is incorporated herein in its entirety by reference.

BACKGROUND

1. Field

One or more embodiments of the present disclosure relate to an apparatus and a method for controlling a focus detectable image sensor.

2. Description of the Related Art

Among the recent developments in digital photographing devices is the development of image plane phase difference autofocus (AF) mechanisms that have an image sensor. In particular, these developments include AF mechanisms that have pixels for receiving light transmitted through a portion of an exit pupil region of an imaging lens and focus detecting pixels for receiving light transmitted through another portion of the exit pupil region. Such AF mechanisms use the received light for focus detection.

Thus, using an image plane phase difference AF mechanism, a digital photographing device can display live-view images by reading pixels of the image sensor, and, at the same time, carry out focus detection by reading out the focus detecting pixels.

However, since the image plane phase difference AF mechanisms generally perform focus detection at every frame cycle (according to a live-view frame rate), if the brightness of an object is low, the charge accumulation time (or exposure time) of the focus detecting pixels may be insufficient. Therefore, it may be difficult for the device to detect focus under low brightness conditions.

Although there currently exists methods capable of independently adjusting charge accumulation times with respect to the respective pixels included in an image sensor, these methods require each pixel to have a separate signal line. As a result, noises may increase and circuit configuration becomes complicated.

Furthermore, even if charge accumulation times with respect to the respective pixels may be independently adjusted, the overall period of time elapsed for processing a single frame of live-view images increases as charge accumulation times increase, and thus it may be difficult for the device to display live-view images at a high frame rate.

SUMMARY

One or more embodiments of the disclosure include an apparatus and a method for controlling, based on brightness of an object charge, accumulation times of focus detecting pixels included in an image plane phase difference AF image sensor.

Therefore, when the brightness of an object is low, a readout mode for maintaining time for reading out an image sensor and increasing only exposure time of focus detecting pixels may be set, thereby improving focus detection efficiency while a frame rate of live view display is maintained. Furthermore, when brightness of an object is normal or based on a preset condition, it may be switched to a readout mode for performing live-view display and focus detection at a high frame rate. Therefore, power consumption may be reduced.

Additional aspects will be set forth in part in the description that follows and, in part, will be apparent from the description, or through practice of the disclosed embodiments.

According to one or more embodiments of the present disclosure, an image sensor control device includes: an image sensor that includes focus detecting pixels; an object brightness detecting unit that detects brightness of an object; a mode determining unit that determines a first readout mode or a second readout mode based on the detected brightness of the object; a read-out unit that reads out the focus detecting pixels in the determined readout mode; and a focus detecting unit that performs focus detection by using focus detection data read out from the focus detecting pixels. In the first readout mode, the read-out unit reads out the focus detecting pixels in a first interval, and, in the second readout mode, the read-out unit reads out the focus detecting pixels in a second interval, which is longer than the first interval.

In an embodiment, the read-out unit selectively reads out designated lines of the image sensor and outputs image signals for generating live-view images.

In an embodiment, the image sensor control device further includes a correcting unit that corrects an output of the focus detecting pixel with an image signal output of a pixel adjacent to the focus detecting pixel; and an image generating unit that generates live-view images by using the read out image signals.

In an embodiment, the first interval is one frame cycle of live-view images.

According to an embodiment, in the first readout mode, the read-out unit selectively reads out lines including the focus detecting pixels from the image sensor in the first interval and outputs image signals for generating live-view images and the focus detection data.

According to an embodiment, in the second readout mode, the read-out unit reads out a first line including no focus detecting pixels from the image sensor in the first interval, and the read-out unit reads out a second line including the focus detecting pixels form the image sensor in the second interval.

According to an embodiment, in the second readout mode, the read-out unit reads out the first line and outputs live-view image signals and reads out the second line and outputs focus detection data.

In an embodiment, the mode determining unit determines whether a half-shutter signal is input. If the half-shutter signal is not input, the mode determining unit determines the first readout mode as the readout mode and, if the half-shutter signal is input, the mode determining unit determines the readout mode based on the determined brightness of the object.

In an embodiment, if it is determined that it is unable to perform focus detection based on focus detection data read out from the focus detecting pixels, the mode determining unit determines the second readout mode as the readout mode.

In an embodiment, the mode determining unit further includes a brightness determining unit. If the brightness of the object is smaller than or equal to a designated value, the brightness determining unit: (1) determines that the brightness of the object to be low, and (2) determines the second readout mode to be the readout mode.

In an embodiment, the designated value is determined based on the saturated output of the focus detecting pixel.

According to one or more embodiments, a method of controlling an image sensor having focus detecting pixels includes: detecting the brightness of an object; determining a readout mode based on the detected brightness of the object; reading out the focus detecting pixels in the determined readout mode; and performing focus detection by using focus detection data read out from the focus detecting pixels. In the first readout mode, the focus detecting pixels are read out in a first interval. In the second readout mode, the focus detecting pixels are read out in a second interval, which is longer than the first interval.

In an embodiment, the first interval is one frame cycle of live-view images.

In an embodiment, the reading out of the focus detecting pixels includes, in the first readout mode, selectively reading out lines including the focus detecting pixels from the image sensor in the first interval and outputting image signals for generating live-view images and the focus detection data.

In an embodiment, the reading out of the focus detecting pixels includes, in the second readout mode, reading out a first line including no focus detecting pixels from the image sensor in the first interval, and reading out a second line including the focus detecting pixels form the image sensor in the second interval.

In an embodiment, the reading out of the focus detecting pixels includes, in the second readout mode, reading out the first line, outputting live-view image signals, reading out the second line, and outputting focus detection data.

In an embodiment, the determining of the readout mode includes: determining whether a half-shutter signal is input; if the half-shutter signal is not input, determining the first readout mode as the readout mode; and, if the half-shutter signal is input, determining the readout mode based on the determined brightness of the object.

In an embodiment, the determining of the readout mode includes: if it is determined that it is unable to perform focus detection based on focus detection data read out from the focus detecting pixels, determining the second readout mode as the readout mode.

In an embodiment, the determining of the readout mode includes: if the brightness of the object is smaller than or equal to a designated value, determining that the brightness of the object is low, and, if it is determined that the brightness of the object is low, determining the second readout mode as the readout mode.

According to one or more embodiments, there is provided a non-transitory computer readable recording medium having recorded thereon a computer program for implementing a method of controlling a digital photographing apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
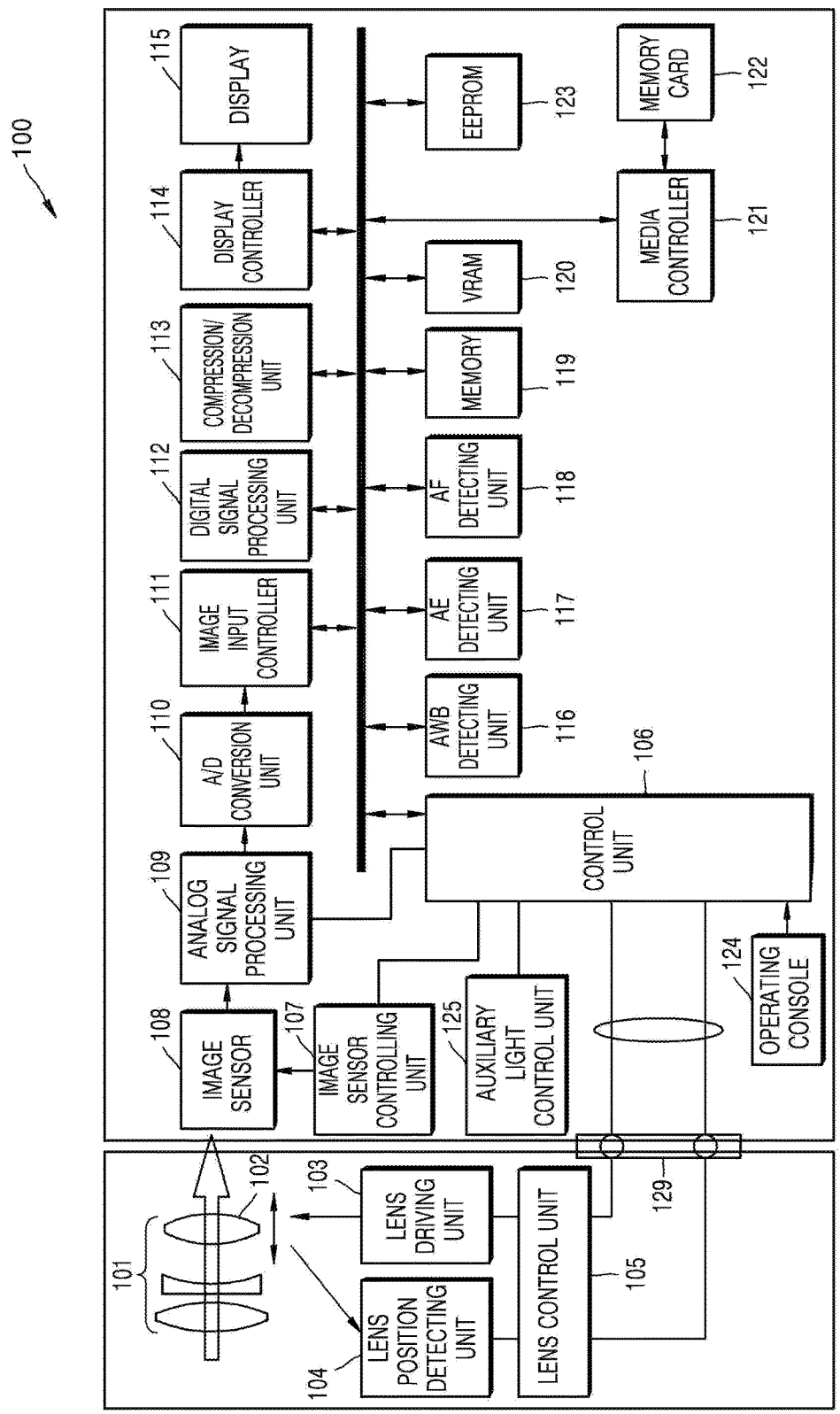
FIG. 1 is a block diagram of a digital photographing apparatus employing an image plane phase difference AF mechanism according to an embodiment.

Reference will now be made in detail to embodiments, examples of which are illustrated in the accompanying drawings, wherein like reference numerals refer to like elements throughout. In the description with reference to the drawings, like reference numerals in the drawings denote like elements, and repetitive descriptions thereof will be omitted. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Although terms, such as "first" and "second", may be used to describe various elements, the elements are not limited by these terms. These terms are only used to differentiate one element from another element.

The present disclosure allows various kinds of modification and can have many embodiments, and particular embodiments are illustrated in the drawings and described in detail herein. However, it is to be understood that the particular embodiments do not limit the present disclosure to a particular embodiment but include every modified, equivalent, or replaced one within the spirit and technical cope of the present disclosure. As used herein, the term "and/or" includes any and all combinations of one or more of the associated listed items.

The terminology used in this application is used to describe particular embodiments and does not limit the present disclosure. An expression in the singular includes an expression in the plural unless they are clearly different from each other in context. In this application, terms, such as "include" and "have", are used to indicate the existence of features, numbers, steps, operations, elements, parts, or combinations thereof mentioned herein without excluding in advance the possibility of existence or addition of one or more other features, numbers, steps, operations, elements, parts, or combinations thereof.

When a component is referred to as being "connected to" another component, it can not only be "directly connected," but also "electrically connected" across an intervening device. Furthermore, when a unit is referred to as "comprising" or "including" a component(s), it does not exclude other components unless stated otherwise and shall be referred to as comprising or including the other components.

FIG. 1 is a block diagram of a digital photographing apparatus employing an image plane phase difference AF mechanism according to an embodiment of the disclosure (referred to hereinafter as a 'digital photographing apparatus 100').

Although the digital photographing apparatus 100 is shown as having detachable lens, the lens may also be embodied as an integrated type. Furthermore, by using the image sensor 108 according to an embodiment of the disclosure, the digital photographing apparatus 100 may be capable of performing phase difference AF and contrast AF.

The digital photographing apparatus 100 includes an imaging lens 101 having a focusing lens 102. The digital photographing apparatus 100 has a focus detection function and may drive the focusing lens 102. The imaging lens 101 may include a lens driving unit 103 that drives the focusing lens 102, a lens position detecting unit 104 that detects position of the focusing lens 102, and a lens control unit 105 that controls the focusing lens 102. The lens control unit 105 communicates with a control unit 106 of the digital photographing apparatus 100 and exchanges data regarding focus detection.

The digital photographing apparatus 100 includes the image sensor 108, picks up light (from an object) transmitted through the imaging lens 101, and generates image signals. The image sensor 108 may include a plurality of photoelectric conversion units (not shown) arranged in a matrix shape and a transmission path (not shown) for reading out image signals by moving charges from the photoelectric conversion units. Meanwhile, a designated number of focus detecting pixels may be arranged at a particular location at the image sensor 108 and perform an image plane phase difference AF function. Detailed descriptions of phase difference AF functions performed by focus detecting pixels in various embodiments will be described below with reference to FIGS. 2 through 5.

An image sensor controlling unit 107 generates a timing signal and controls the image sensor 108 to pick up an image. Furthermore, the image sensor controlling unit 107 may sequentially read out image signals when charge accumulations are completed at the respective scan lines.

Read-out signals may be converted into digital signals via an analog signal processing unit 109 and an ND conversion unit 110 and may be input to and processed by an image input controller 111.

An AWB calculation, an AE calculation, and an AF calculation are performed with respect to digital image signals input to the image input controller 111 by an auto white balance (AWB) detecting unit 116, an auto exposure (AE) detecting unit 117, and an AF detecting unit 118, respectively. Here, the AF detecting unit 118 outputs a value detected with respect to contrasts during a contrast AF and outputs pixel data to the control unit 106 during a phase difference AF for a phase difference calculation. The control unit 106 may performs phase difference calculation by using correlations between a plurality of pixel column signals. As a result of the phase difference calculation, a position of focus or a direction of the focus may be obtained.

Meanwhile, outputs of focus detecting pixels are output together when live-view or image-view (referred to hereinafter as 'live-view') images are output. In other words, when live-view images are output, image signals are output by selectively reading out designated pixel lines of an image pixel, where outputs of focus detecting pixels may be included therein. Therefore, focus detection may be performed by using focus detection data output by the focus detecting pixels.

Image signals are also stored in a synchronous dynamic random access memory (SDRAM) 119, which is a temporary memory. A digital signal processing unit 112 performs a series of image signal processes, such as gamma correction, and generates a displayable live-view image or a picked up image. A compression/decompression unit 113 compresses image signals in a compression format, such as the JPEG compression format or the H.264 compression format, or decompresses for playback. An image file that includes image signals compressed by the compression/decompression unit 113 is transmitted to a memory card 122 via a media controller 121 and stored in the memory card 122. Image data to be displayed is stored in a video random access memory (VRAM) 120 and an image corresponding thereto is displayed on a liquid crystal display (LCD) 115 via a video encoder 114. The control unit 106 controls the overall operations of the components. An electrically erasable programmable read-only memory (EEPROM) 123 stores and maintains data for correcting pixel defects of the image sensor 108 or adjustment data. An operating console 124 receives various instructions from a user for operating the digital photographing apparatus 100. The operating console 124 may include any of various buttons, such as a shutter-release button, a main button, a mode dial, and a menu button.

Figure 2:
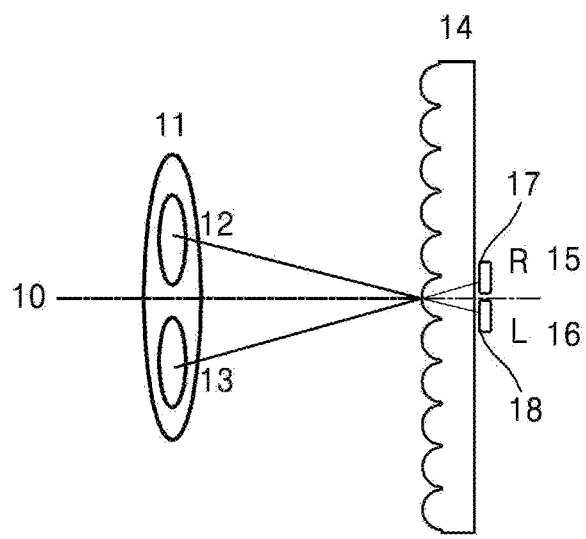
FIG. 2 is a diagram that describes the mechanism of a focus detecting pixel using the image sensor of FIG. 1.

FIG. 2 is a diagram for describing the mechanism of a focus detecting pixel using the image sensor 108 of FIG. 1.

Light from an object is transmitted through the imaging lens 11, passes through a micro lens array 14, and is guided to light receiving pixels R and L 15 and 16. Light screens 17 and 18 or limited apertures for limiting pupils 12 and 13 from the imaging lens 11 are arranged at portions of the light receiving pixels R and L 15 and 16. Furthermore, light from the pupil 12 above the optical axis 10 of the imaging lens 11 is guided to the light receiving pixel L 16, whereas light from the pupil 13 below the optical axis 10 of the imaging lens 11 is guided to the light receiving pixel R 15. Guiding light inversely projected at the pupils 12 and 13 by the micro lens array 14 to the light receiving pixels R and L 15 and 16 is referred to as "pupil division."

The continuous output of the light receiving pixel R 15 and the continuous output of the light receiving pixel L 16 (which have both received light as a result of pupil division by the micro lens array 14) exhibit the same shape, but exhibit different phases with respect to position. The reason for this is that image formation positions of light from the eccentrically formed pupils 12 and 13 of the imaging lens 11 are different from each other. Thus, when focus points of light from the eccentrically formed pupils 12 and 13 are inconsistent with each other, the light receiving pixels R 15 and L 16 exhibit different output phases. On the other hand, when focus points of light from the eccentric pupils 12 and 13 are consistent with each other, images are formed at a same position. A direction of focus may be determined from the focus difference.

For example, in a front focus state (e.g., the focus is in front of the object), the phase of the output of the light receiving pixel R 15 is shifted further to the left than that in the focused phase, and the phase of the output of the light receiving pixel L 16 is shifted further to the right than that in the focused phase. In contrast, in a back-focusing state (e.g., the focus is in back of the object), the phase of the output of the light receiving pixel R 15 is shifted further to the right than that in the focused phase, and the phase of the output of the light receiving pixel L 16 is shifted further to the left than that in the focused phase. The shift amount between the phases of the light receiving pixels R 15 and L 16 may be converted to a deviation amount between the focuses.

Figure 3:
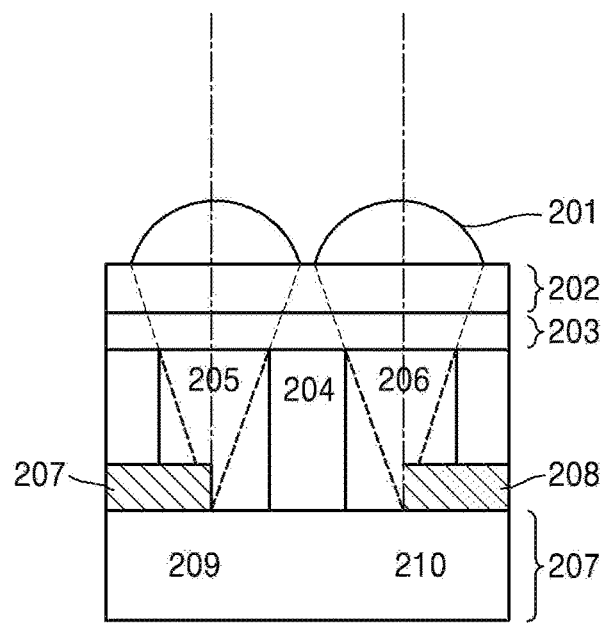
FIG. 3 shows a vertical pixel configuration of a phase difference detecting pixel.

FIG. 3 shows a vertical pixel configuration of a phase difference detecting pixel in the related art. For convenience of explanation, FIG. 3 shows that an R column pixel and an L column pixel are arranged adjacent to each other. However, the disclosure is not limited thereto. A micro lens 201, a surface layer 202, a color filter layer 203, a wiring layer 204, photo diode layers 205 and 206, and a substrate layer 209 are shown. The structure shown in FIG. 3 is simplified than an actual layer structure. Light from an object passes through the micro lens 201 and arrives at a photo diode layer of each pixel. As light is received, electrons (charge) are generated by a photo diode, and the electrons become pixel data. The electrons generated by the photo diode may be carried away by the wiring layer 204. Light incident from an object is the entire light flux passed through the exit pupil of an imaging lens, and brightness data regarding locations of the object may be acquired based on locations of pixels. The color filter layer 203 generally employs three colors including red (R), green (G), and blue (B). As occasion demands, the color filter layer 203 may employ three colors including cyan (C), magenta (M), and yellow (Y). Next, a light blocking film is arranged at an aperture of an imaging device to acquired signals from the R column and the L column. The structure may include the photo diode layers 205 and 206, a R column light blocking film 207, and a L column light blocking film 208. However, locations of light blocking films are not limited to those shown in FIG. 3, and light blocking layers may be located at any of various locations between a lens and a photo diode.

Figure 4:
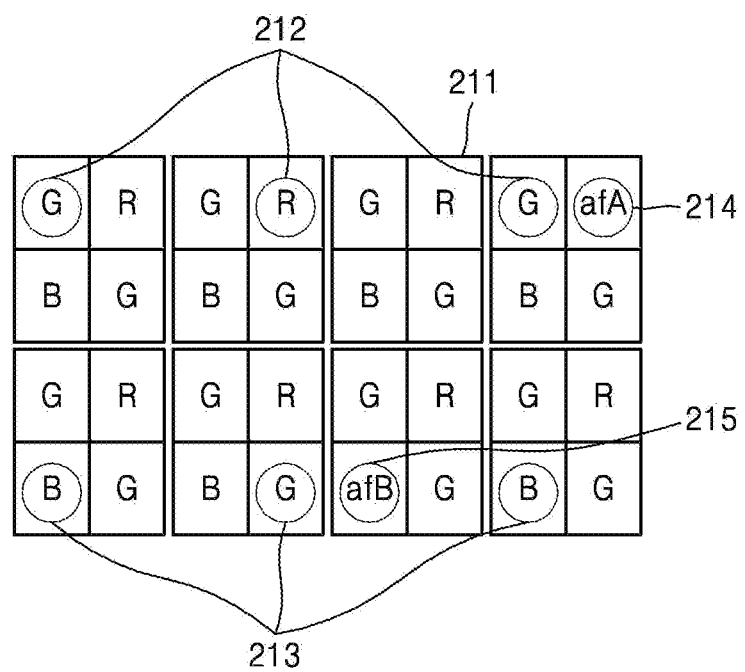
FIG. 4 is a pixel arrangement diagram showing a portion of an imaging device in closer detail, showing an arrangement of phase difference detecting pixels.

FIG. 4 is a pixel arrangement diagram 211 showing a portion of an imaging device in closer detail, which shows an arrangement of phase difference detecting pixels.

In a pixel based on Bayer arrangement using RGB color filters, the RGB color filters include red, green, and blue filters. When displaying live-view images, G, R pixels 212 and B, G pixels 213 are read out. In other words, only sampled pixels from among all imaging pixels are read out.

Meanwhile, the phase difference detecting pixels shown in FIG. 3 are indicated as afA 214 and afB 215 and are arranged proximate to one another. Therefore, from among phase difference detecting pixels of each column, 8 pixels, 12 pixels, or 24 pixels correspond to an R column and an L column of FIG. 2 as a unit and are used for correlation calculation described above with reference to FIG. 2.

In case of displaying live-view images, phase difference detecting pixels are read out independently from common pixel columns. Therefore, after common pixels are read out, only the phase difference detecting pixels are read out. However, during an image capturing operation, the phase difference detecting pixels are also sequentially read out in the same way as the common pixels are read out.

Figure 5:
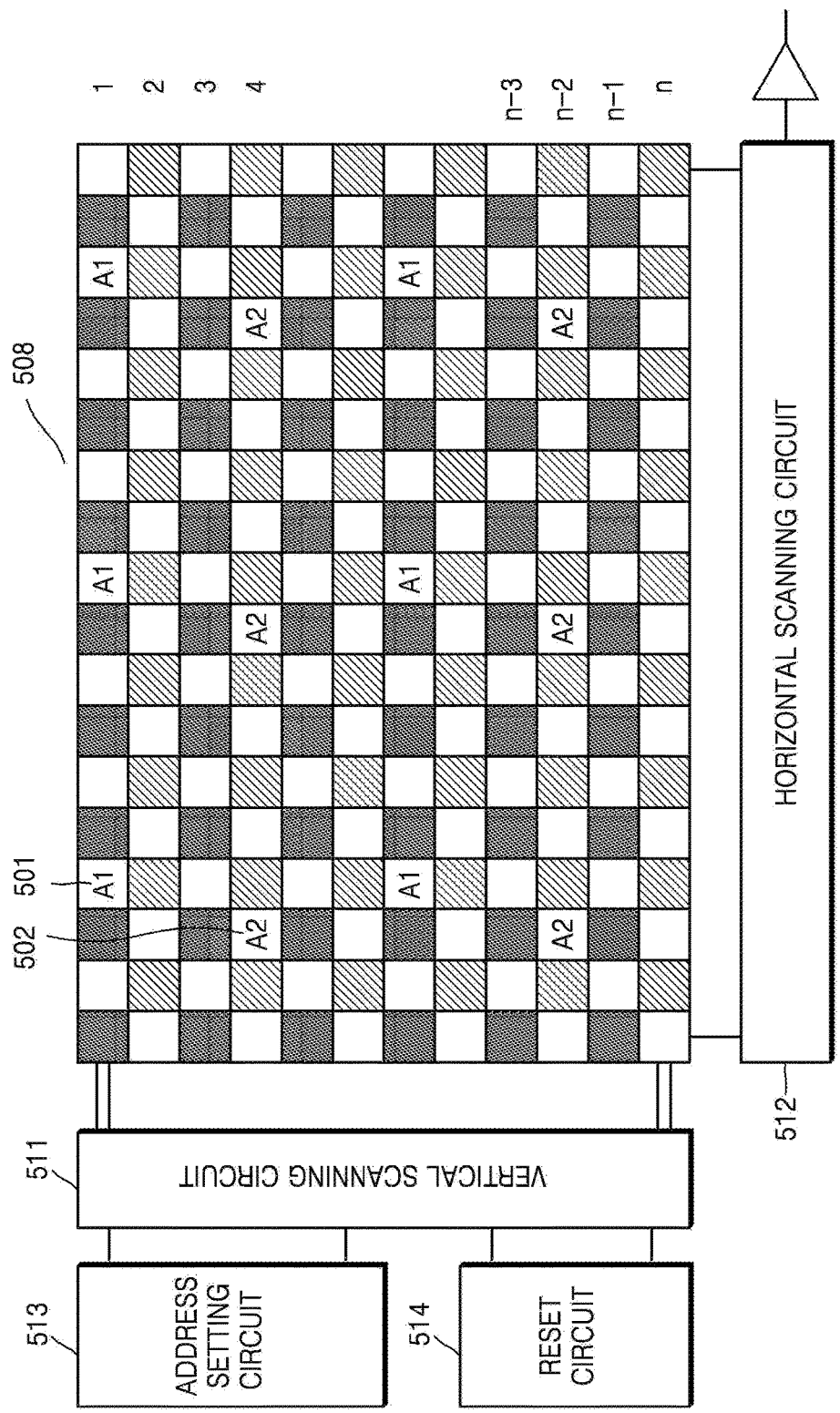
FIG. 5 is a diagram showing a method of reading out an image sensor.

FIG. 5 is a diagram showing a method of reading out an image sensor.

Referring to FIG. 5, a focus detecting pixel A1 501 and a focus detecting pixel A2 502 of an image sensor 508 may be arranged in each of pixels for detecting phase differences in horizontal directions. Furthermore, according to an embodiment of the disclosure, a vertical scanning circuit 511, a horizontal scanning circuit 512, an address setting circuit 513, and a reset circuit 514 may be connected to the image sensor 508 and read out charges accumulated in the image sensor 508.

First, the address setting circuit 513 may set up a pixel line to be read out by the vertical scanning circuit 511. Therefore, the vertical scanning circuit 511 may sequentially read out pixel lines set up by the address setting circuit 513. The horizontal scanning circuit 512 may sequentially read out pixels of each of columns of lines read out by the vertical scanning circuit 511. The reset circuit 514 resets charges accumulated at read-out pixels, such that charges to be read out in a next cycle may be accumulated at the pixels.

For example, when a picked up image is output by the image sensor 508, the vertical scanning circuit 511 and the horizontal scanning circuit 512 may sequentially read out from pixels at the topmost line of the image sensor 508 to pixels at the last line of the image sensor 508.

Figure 6:
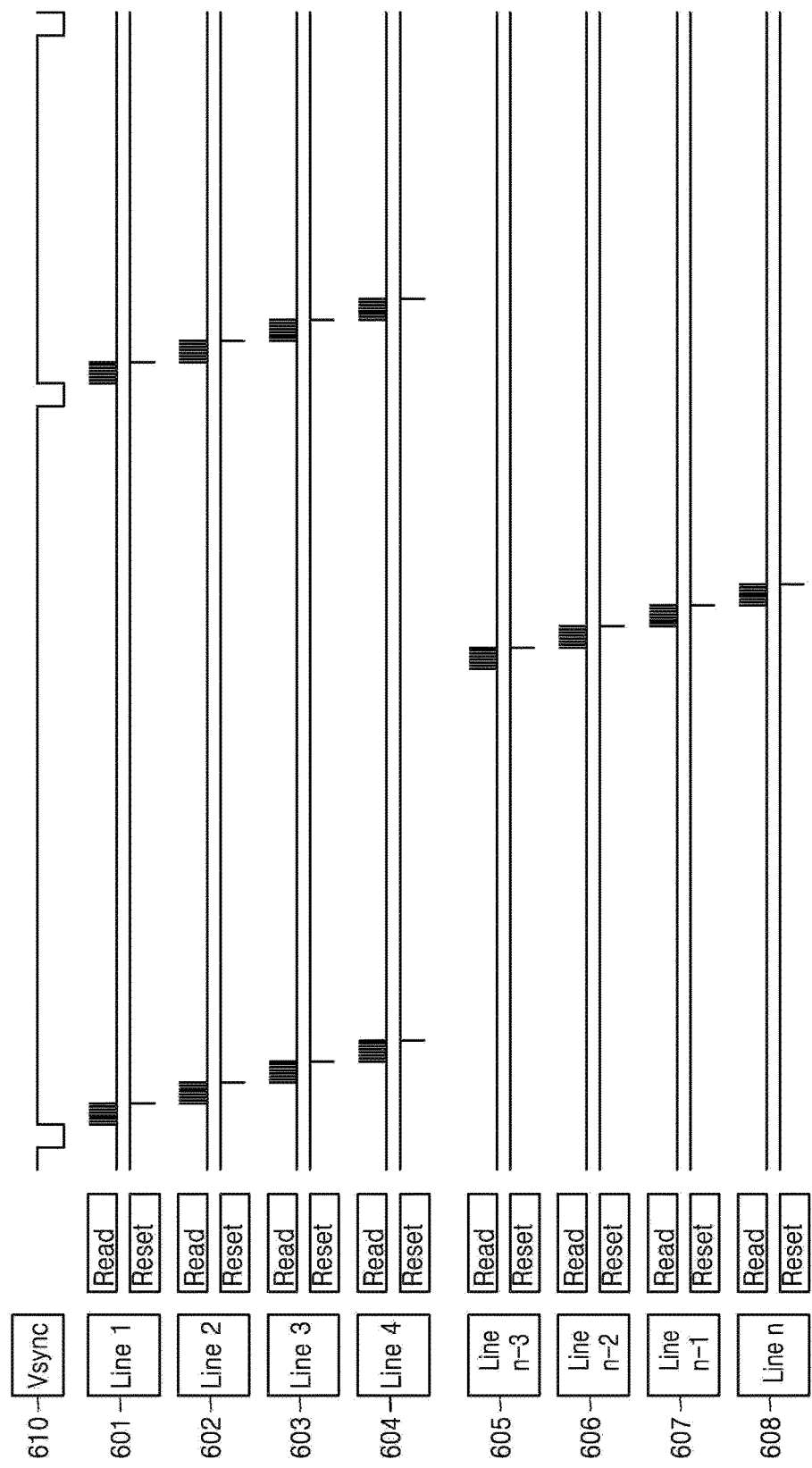
FIG. 6 is a timing diagram showing an example of reading out an image sensor according to an embodiment.

In detail, FIG. 6 is a timing diagram showing an example of reading out an image sensor according to an embodiment of the disclosure.

When a picked up image is output, all lines from a first line 601 to an $n^{th}$ line 608 of the image sensor 508 may be sequentially read out. Here, in correspondence to increase of a Vsync signal 610, the first line 601 begins to be read out. When the readout of the first line 601 is completed, a reset signal is generated and the first line 601 begins to accumulate new charges, and, at the same time, a next line 602 begins to be read out. When such operations are repeated to the last line 608, one cycle read out is completed. Here, the one cycle read out may refer to a period of time elapsed for accumulating charges at a single pixel for generating a single picked up image frame during an image pickup. Therefore, in case of picking up live-view images, the one cycle read out may refer to a period of time elapsed for generating one frame of live-view.

Referring back to FIG. 5, in case of displaying live-view images, sampled pixels and the focus detecting pixels 501 and 502 may be read out from among all pixels of the image sensor 508.

For example, based on a setting of the address setting circuit 513, the vertical scanning circuit 511 may selectively read out a designated line of an image sensor and may output image signals for generating live-view images. Here, the selected designated line may include focus detecting pixels 501 and 502. Therefore, not only live-view images, but also focus detection data may be output together during a readout.

However, the disclosure is not limited to selective readout of lines, and the horizontal scanning circuit 512 may selectively read out vertical pixel columns and output live-view images and phase difference data.

Since the readout operation is repeated at every frame of live-view images, focus detection data accumulated at focus detecting pixels may also be output at every frame. Therefore, focus detection may be performed by using the output focus detection data simultaneously as live-view images are displayed.

However, under a low brightness condition, amounts of charge accumulated at focus detecting pixels during one frame cycle of live-view images may be insufficient for performing focus detection. Particularly, the higher a frame rate of live-view images becomes, the more frequently such a phenomenon may occur.

Therefore, according to a method of controlling an image sensor according to an embodiment of the disclosure, when brightness of an object is low, focus may be detected by increasing charge accumulation times of focus detecting pixels. Hereinafter, a method of controlling charge accumulation times of focus detecting pixels included in an image plane phase difference AF image sensor according to brightness of an object will be described in detail with reference to FIGS. 7 through 14.

Figure 7:
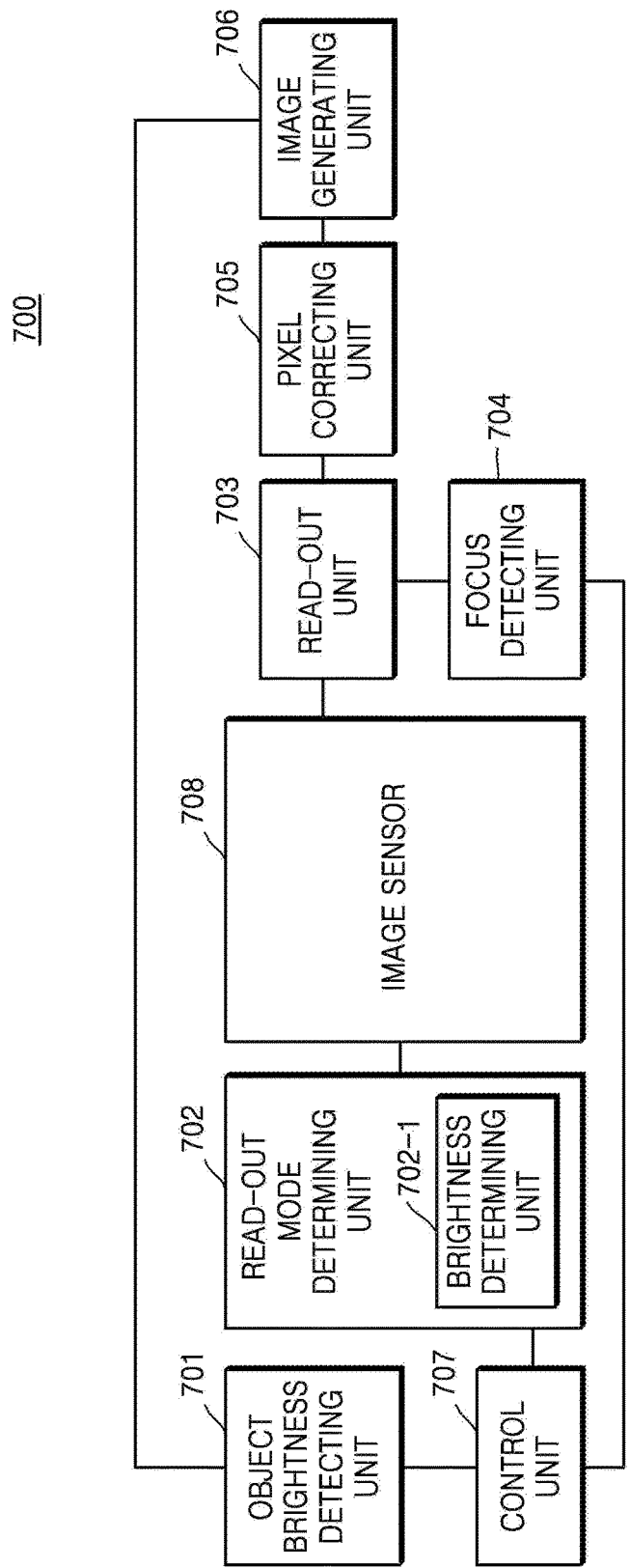
FIG. 7 is a block diagram showing an example of a focus-detectable image sensor control device 700 according to an embodiment.

FIG. 7 is a block diagram showing an example of a focus-detectable image sensor control device 700 according to an embodiment of the disclosure.

FIG. 7 shows that the focus-detectable image sensor control device (referred to hereinafter as 'image sensor control device') 700 includes only components related to the present embodiment. Therefore, one of ordinary skill in the art will understand that general purpose components other than the component shown in FIG. 7 may further be included.

The image sensor control device 700 includes an object brightness detecting unit 701, a read-out mode determining unit 702, a read-out unit 703, a focus detecting unit 704, a pixel correcting unit 705, an image generating unit 706, a control unit 707, and the image sensor 708. Furthermore, the read-out mode determining unit 702 may further includes a brightness determining unit 702-1.

The image sensor 708 according to an embodiment of the disclosure may include pixels for receiving lights transmitted through a portion of an exit pupil region of an imaging lens and focus detecting pixels for receiving lights transmitted through another portion of the exit pupil region and using the received lights for focus detection.

The object brightness detecting unit 701 may detect brightness of an object. For example, the object brightness detecting unit 701 may detect brightness of an object by detecting the output of G pixels included in the image sensor 708 during a readout. However, the disclosure is not limited thereto, and any of various methods for detecting brightness of an object may be utilized.

The read-out mode determining unit 702 may determine a readout mode based on the detected brightness of the object.

First, if the detected brightness of the object is equal to or greater than a designated value, the brightness determining unit 702-1 may determine that brightness of the object is normal. On the contrary, if the detected brightness of the object is smaller than or equal to the designated value, the brightness determining unit 702-1 may determine that brightness of the object is low. Here, the designated value may be pre-set to one-fourth of the saturated output of a focus detecting pixel. The saturated output of a focus detecting pixel is the maximum amount of charges that may be accumulated by a focus detecting pixel via an exposure. Other values besides one-fourth may also be used, as appropriate.

Next, if brightness of the object is normal, the read-out mode determining unit 702 may set a first readout mode to the readout mode. If brightness of the object is low, the read-out mode determining unit 702 may set a second readout mode to the readout mode.

As used herein, the first readout mode may refer to a mode in which the read-out unit 703 described below reads out focus detecting pixels in a first interval, whereas the second readout mode may refer to a mode in which the read-out unit 703 reads out focus detecting pixels in a second interval, where the second interval is longer than the first interval. Furthermore, the first interval may be one frame cycle of live-view images.

The read-out unit 703 according to an embodiment of the disclosure may read out the image sensor 708 according to a determined readout mode. Here, the read-out unit 703 includes the vertical scanning circuit 511, the horizontal scanning circuit 512, the address setting circuit 513, and the reset circuit 514 as described above with reference to FIG. 5 and may read out charges accumulated at the image sensor 708 according to a set readout mode.

First, if the first readout mode is set to the readout mode, the read-out unit 703 may read out focus detecting pixels in the first interval. Hereinafter, detailed descriptions of the first readout mode will be given below with reference to FIGS. 8 through 11.

Figure 8:
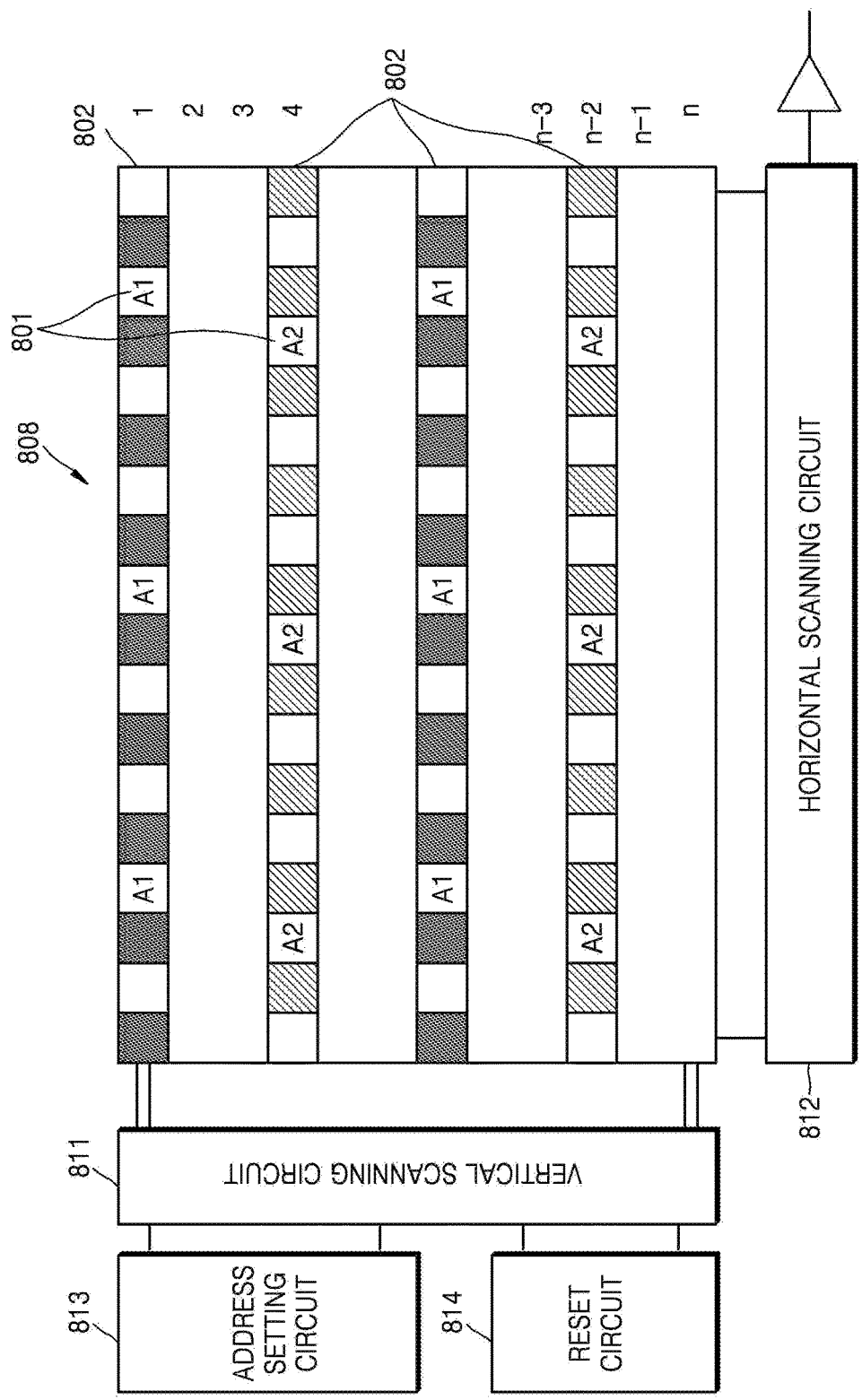
FIG. 8 is a diagram showing an example of how a read-out unit reads out an image sensor in a first readout mode, according to an embodiment.

FIG. 8 is a diagram showing an example that the read-out unit 703 reads out the image sensor 708 in the first readout mode, according to an embodiment of the disclosure.

To display live-view images, the image sensor control device 700 according to an embodiment of the disclosure may selectively read out designated lines of an image sensor 808 and output image signals for generating the live-view images. Therefore, in the first readout mode, the image sensor control device 700 reads out lines including both focus detecting pixels and imaging pixels, and thus focus detection may be performed by using focus detection data output by the focus detecting pixels simultaneously as live-view images are displayed. Furthermore, since readout operation for displaying live-view images is repeated in an interval corresponding to one frame of live-view images, focus detection data accumulated at focus detecting pixels is also output at every frame, and thus focus detection may be performed as fast as a frame rate of the live-view images.

Meanwhile, although FIG. 8 shows that all of the selected lines 802 include focus detecting pixels 801, the disclosure is not limited thereto in the first readout mode, and designated lines may be selectively read out regardless of existence of focus detecting pixels.

Figure 11:
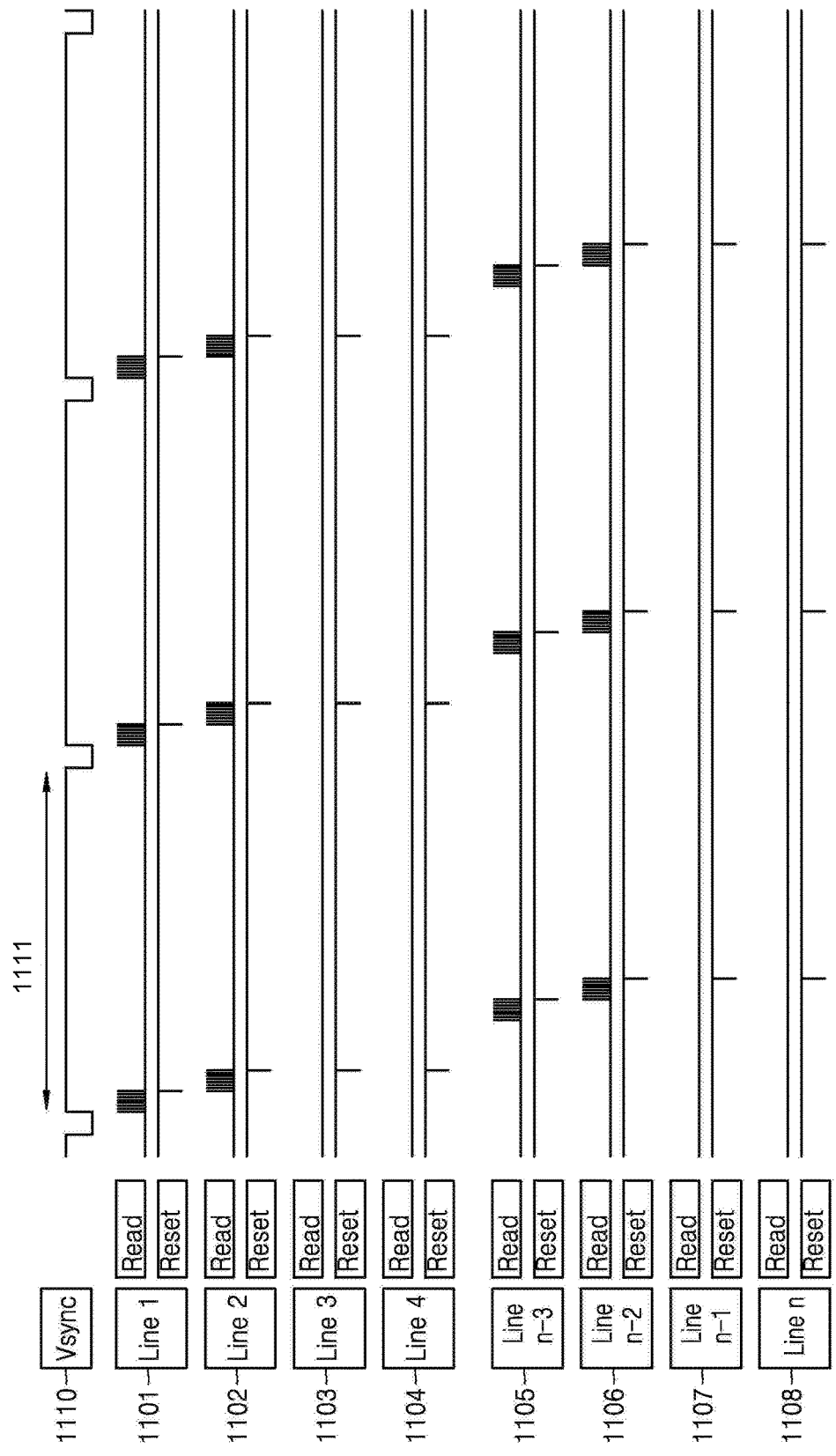
FIG. 11 is a timing diagram showing how a read-out unit reads out an image sensor in a first readout mode, according to an embodiment.

FIG. 11 is a timing diagram showing that a readout unit reads out an image sensor in the first interval in the first readout mode, according to an embodiment of the disclosure.

In FIG. 11, to display live-view images, the image sensor control device 700 according to an embodiment of the disclosure may selectively read out designated lines 1101, 1102, 1105, and 1106 of the image sensor 808 and may output image signals for generating the live-view images. For example, the two lines 1101 and 1102 including focus detecting pixels may be read out, and then next two lines 1103 and 1104 may be skipped.

In detail, in correspondence to an increase of a Vsync signal 1110, the first line 1101 begins to be read out. When the readout of the first line 1101 is completed, charges accumulated at the first line 1101 are reset and charges are accumulated again until a next readout.

Next, when the readout of the first line 1101 is completed, the second line 1102 begins to be read out. When the readout of the second line 1102 is completed, charges accumulated at the second line 1102 are reset like the first line 1101, and a next selected line begins to be read out. Next, the third line 1103 and the fourth line 1104 will be skipped, and lines selected after the third and fourth lines 1103 and 1104 will be read out.

Next, the above-stated operations are repeated, and, when all of the selected lines of the image sensor 808 are read out, readout is performed again from the first line 1101 in correspondence to an increase of the Vsync signal 1110. Therefore, readout operations for displaying live-view images are repeated in an interval corresponding to one frame cycle of the live-view images.

However, under a low brightness condition, amounts of charges accumulated at focus detecting pixels during one frame cycle 1111 of live-view images may be insufficient for performing focus detection. Particularly, the higher a frame rate of live-view images becomes, the more frequently such a phenomenon may occur.

Therefore, the read-out mode determining unit 702 may set the second readout mode to the readout mode for reading out focus detecting pixels for the second interval, which is longer than the first interval when an brightness of an object is low.

Hereinafter, the second readout mode according to an embodiment of the disclosure will be described in detail with reference to FIGS. 9, 10, and 12.

Figure 9:
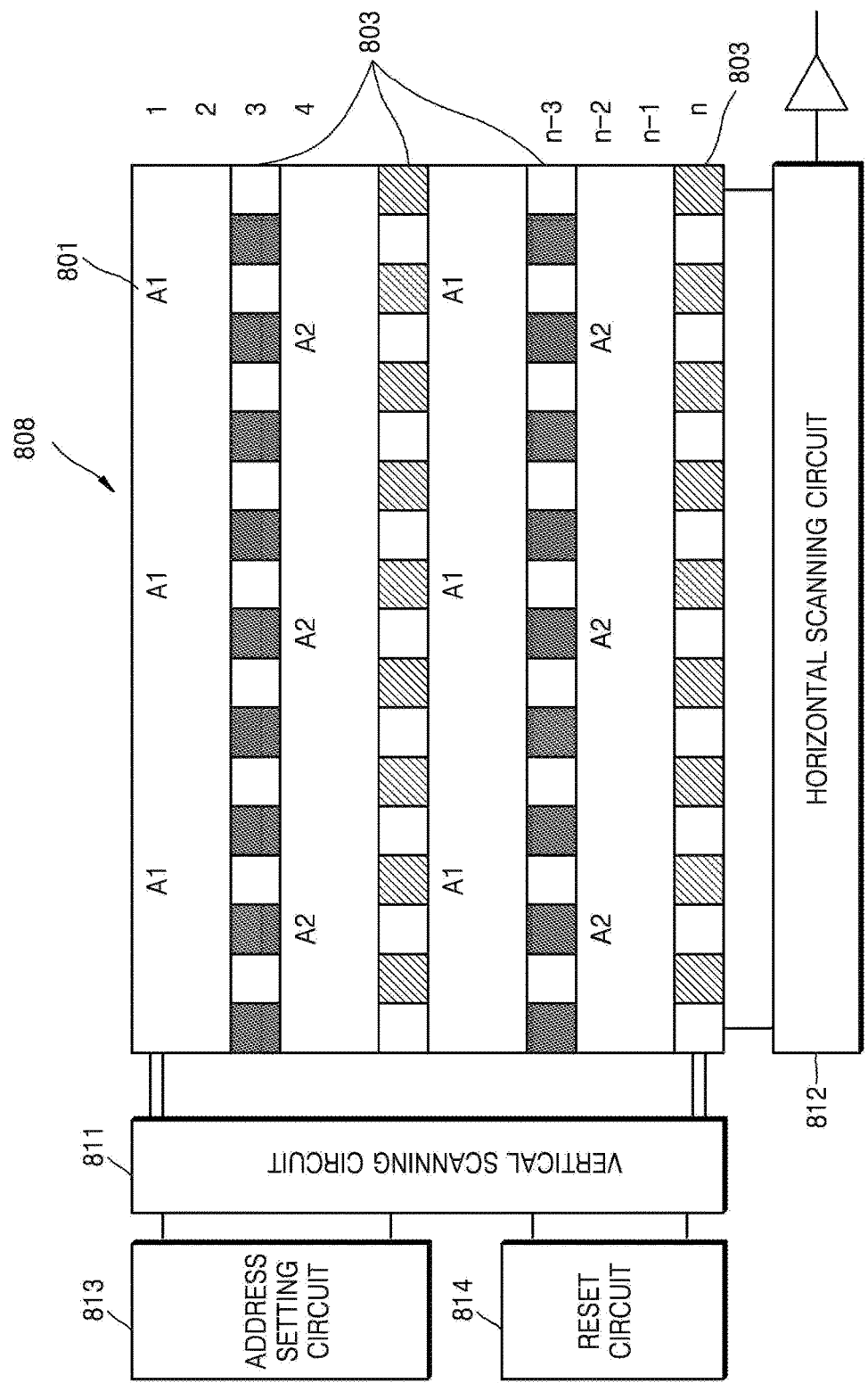
FIG. 9 is a diagram showing an example of how a read-out unit reads out an image sensor in a second readout mode and outputs image signals, according to an embodiment.
Figure 10:
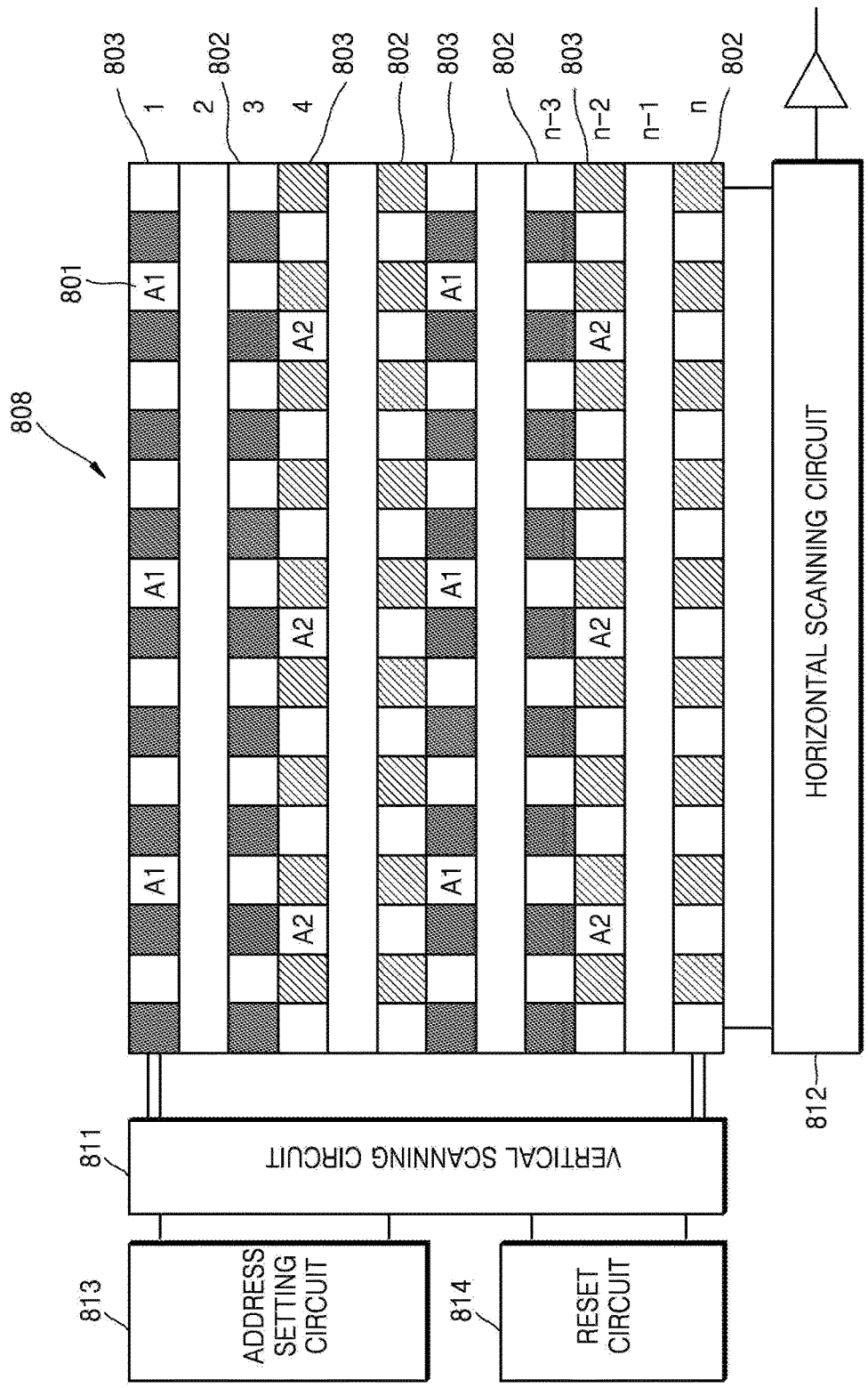
FIG. 10 is a diagram showing an example that a read-out unit reads out an image sensor in a second readout mode and outputs focus detection information, according to an embodiment.

FIGS. 9 and 10 are diagrams showing examples in which the read-out unit 703 according to an embodiment of the disclosure reads out an image sensor in the second readout mode and outputs image signals.

As shown in FIG. 9, when the read-out unit 703 reads out live-view image signals of a first frame from the image sensor 808 in the second readout mode, the read-out unit 703 may read out designated lines 802 including no focus detecting pixels first and output live-view image signals. Next, after the read-out unit 703 reads out all of the designated lines 802 for outputting live-view image signals, the read-out unit 703 may read out a line 803 including focus detecting pixels and output focus detection data. In other words, the designated lines 802 (including no focus detecting pixels) may be read out first to generate live-view images, and then the line 803 including focus detecting pixels may be read out and only focus detection data may be output. The reason is that, as described below, charge accumulation times of all pixels included in the line 803 including focus detecting pixels increase in the second readout mode, and thus outputs of imaging pixels of the line 803 including focus detecting pixels may not be used for generating live-view images.

Next, as shown in FIG. 10, even when the read-out unit 703 according to an embodiment of the disclosure reads out live-view image signals of a second frame, the read-out unit 703 reads out the designated lines 802 including no focus detecting pixels in the same manner as in the operation regarding the first frame and outputs live-view image signals. However, when the live-view image signals of the second frame are read out, lines including focus detecting pixels may not be read out.

In other words, in the second readout mode, the read-out unit 703 may read out the designated lines 802 including no focus detecting pixels at every frame, whereas the read-out unit 703 may read out the line 803 including focus detecting pixels at every other frame. Therefore, charges may be accumulated at the line 803 including focus detecting pixels for one additional frame period. However, the disclosure is not limited thereto, and additional charge accumulation time may be secured by reading out the line 803 including focus detecting pixels at an interval corresponding to every 3 or 4 frame periods.

Figure 12:
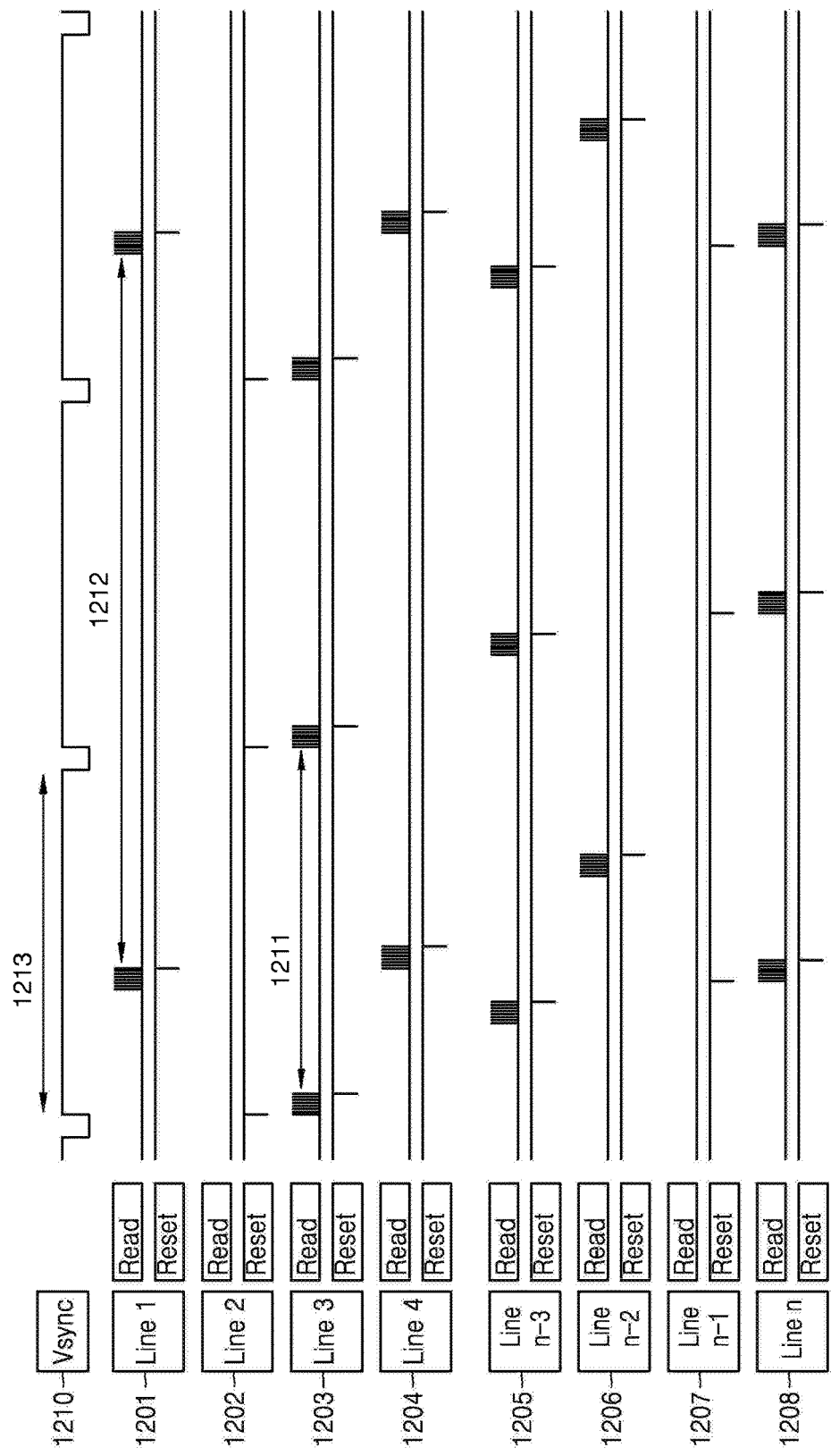
FIG. 12 is a timing diagram showing how a read-out unit reads out an image sensor in the second readout mode, according to an embodiment.

For example, FIG. 12 is a timing diagram showing that the read-out unit 703 according to an embodiment of the disclosure reads out the image sensor 808 in the second readout mode.

If in the second readout mode, the read-out unit 703 may read out first lines 1203, 1205, and 1208 including no focus detecting pixels from the image sensor 808 in a first interval 1211 and output live-view image signals and may read out second lines 1201, 1204, and 1206 including focus detecting pixels from the image sensor 808 in a second interval 1212 and output focus detection data. Here, the first interval may be one frame cycle 1213 of live-view images.

In detail, the read-out unit 703 sequentially reads out the first lines 1203, 1205, and 1208 (including no focus detecting pixels) and outputs live-view image signals. Here, the read-out unit 703 selectively reads out only designated lines of the image sensor 808 to output live-view image signals. For example, as shown in FIG. 12, in every three lines 1201, 1202, and 1203, two lines 1201 and 1202 may be skipped and only one line 1203 may be read out. Here, the lines read out for generating live-view images do not include focus detecting pixels.

After all of the first lines 1203, 1205, and 1208 (including no focus detecting pixels) are read out, the read-out unit 703 may read out second lines 1201, 1204, and 1206 (including focus detecting pixels) from the image sensor 808 in the second interval 1212. In other words, since the second lines 1201, 1204, and 1206, which include focus detecting pixels, are read out one in every two frame cycles 1212, charge accumulation time may be increased. Therefore, if brightness of an object is low, readout of the second lines 1201, 1204, and 1206, which include focus detecting pixels, may be omitted once after every two frames, thereby securing necessary charge accumulation time for focus detection. Furthermore, since a readout for generating live-view images and a readout for focus detection are performed independently from each other, a frame rate of live-view image playback may be maintained, even if charge accumulation times regarding lines including focus detecting pixels are increased.

Meanwhile, referring back to FIG. 7, the read-out mode determining unit 702 according to another embodiment of the disclosure may determine whether a half-shutter signal is input. If the half-shutter signal is not input, the read-out mode determining unit 702 may set the first readout mode to the readout mode. If the half-shutter signal is input, the read-out mode determining unit 702 may determine a readout mode based on the detected brightness of an object. Since the number of lines read out in the second readout mode is greater than that in the first readout mode, more power is consumed in the second readout mode. Therefore, power consumption may be reduced by always selecting the first readout mode before a half-shutter signal (S1 signal) is input.

In other words, as shown in FIG. 9, lines including focus detecting pixels and lines including no focus detecting pixels are separately read out in the second readout mode, the number of lines read out in the second readout mode is relatively larger than the number of lines read out in the first readout mode as shown in FIG. 11. Therefore, if the digital photographing apparatus 100 is in standby, the first readout mode may always be maintained for reducing power consumption.

If focus detection may not be performed by using focus detection data read out from the focus detecting pixels, the read-out mode determining unit 702 according to another embodiment of the disclosure may set the second readout mode as the readout mode.

The focus detecting unit 704 according to an embodiment of the disclosure performs focus detection calculation by using focus detection data read out from focus detecting pixels. Since descriptions of image plane phase difference focus detection are given above with reference to FIGS. 2 through 4, detailed descriptions thereof will be omitted here.

The pixel correcting unit 705 according to an embodiment of the disclosure may correct an output of a focus detecting pixel by using an image signal output of an adjacent pixel. For example, a focus detecting pixel included in the image sensor 708 may be a defective pixel during generation of live-view images. Therefore, the defect of the focus detecting pixel may be corrected by using an image signal output of a pixel adjacent to the focus detecting pixel.

The image generating unit 706 according to an embodiment of the disclosure may generate live-view images by using read out image signals.

Finally, the control unit 707 according to an embodiment of the disclosure may control the object brightness detecting unit 701, the read-out mode determining unit 702, the read-out unit 703, the focus detecting unit 704, the pixel correcting unit 705, the image generating unit 706, and the 708, such that the image sensor control device 700 may control exposure time of focus detecting pixels according to brightness of an object.

Meanwhile, although the image sensor control device 700 according to an embodiment of the disclosure is described as an independent component, the disclosure is not limited thereto, and the image sensor control device 700 may also be understood as a module included in the digital photographing apparatus 100. Therefore, the object brightness detecting unit 701, the read-out mode determining unit 702, the read-out unit 703, the focus detecting unit 704, the pixel correcting unit 705, the image generating unit 706, and the control unit 707 may correspond to a single processor or a plurality of processors (A processor may be embodied as an array of a plurality of logic gates or as a combination of a general purpose microprocessor and a memory having stored therein a program to be executed on the microprocessor.) Furthermore, one of ordinary skill in the art will understand that the object brightness detecting unit 701, the read-out mode determining unit 702, the read-out unit 703, the focus detecting unit 704, the pixel correcting unit 705, the image generating unit 706, and the control unit 707 may be embodied as hardware of different forms.

Figure 13A:
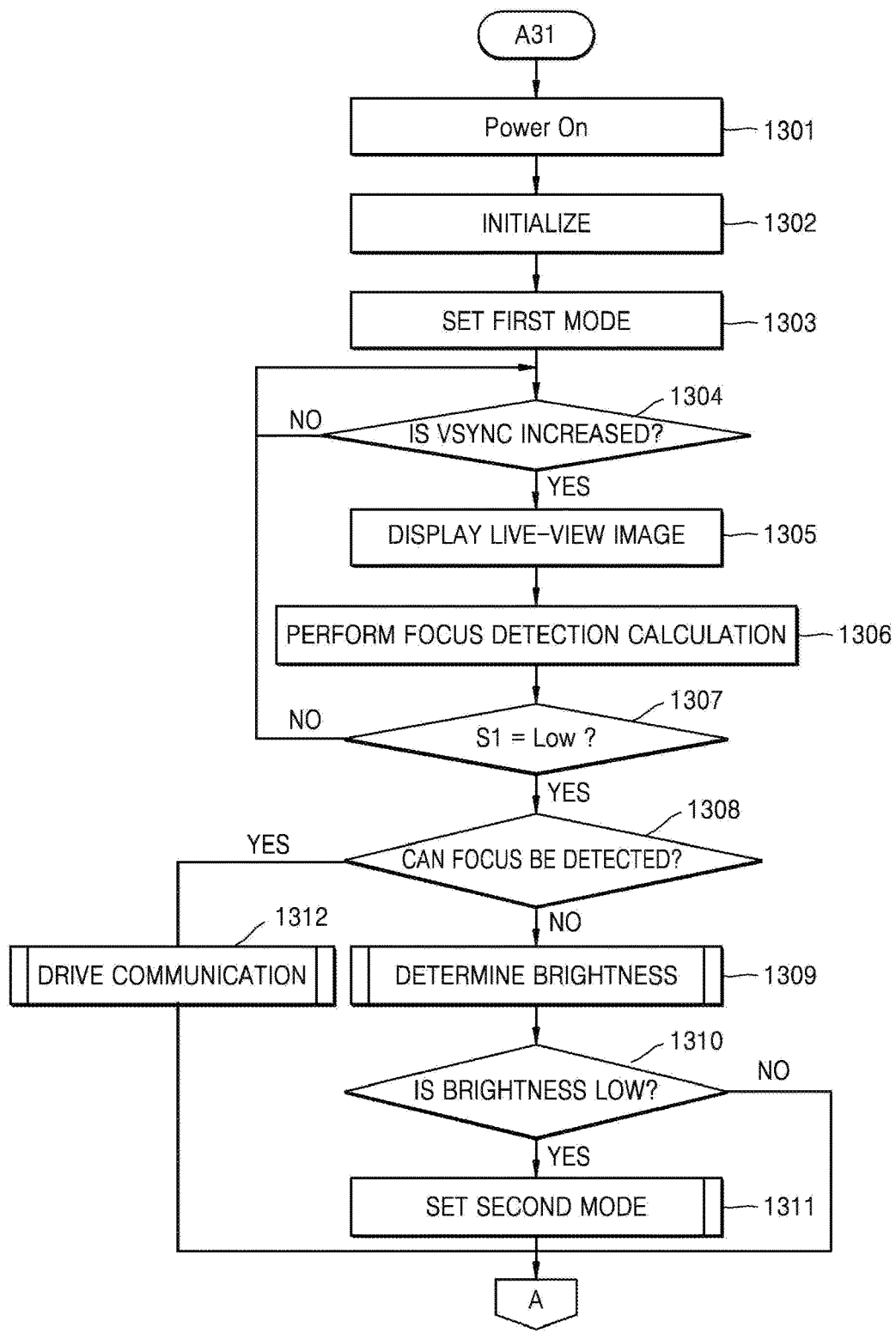
FIGS. 13A and 13B are flowcharts showing a method of controlling a focus-detectable image sensor according to an embodiment.
Figure 13B:
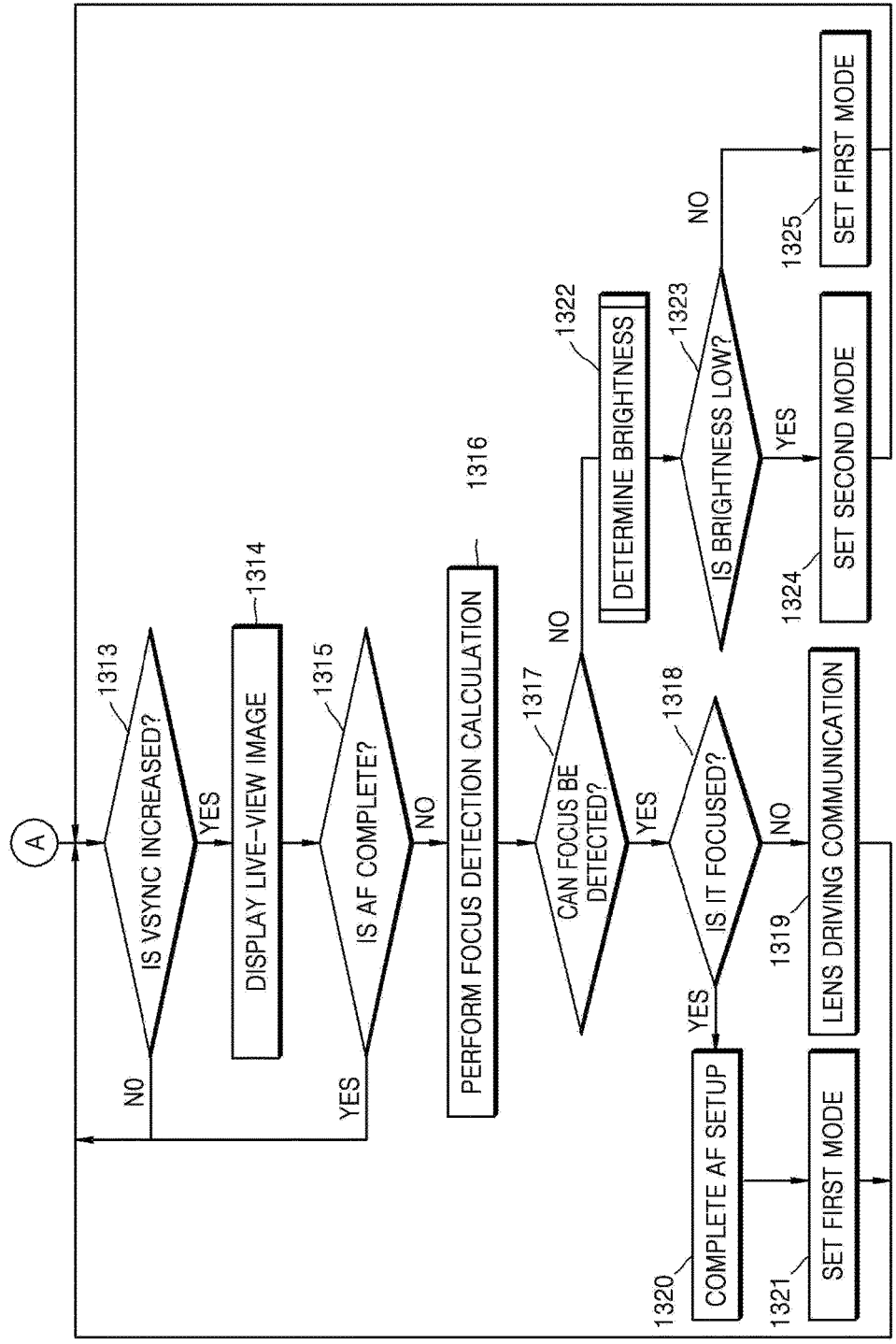

FIGS. 13A and 13B are flowcharts showing a method of controlling a focus-detectable image sensor according to an embodiment of the disclosure.

The method of controlling a focus-detectable image sensor shown in FIGS. 13A and 13B include operations that are performed by the digital photographing apparatus 100 or the image sensor control device 700 in the chronological order. Therefore, even if omitted below, any of the descriptions given above with respect to the digital photographing apparatus 100 and the image sensor control device 700 shown in FIGS. 1 and 7 may also be applied to the method shown in FIGS. 13A and 13B.

In operation 1301, when the image sensor control device 700 is turned on, an operation for controlling the image sensor 708 is initiated by a power on operation.

In operation 1302, the image sensor control device 700 is initialized.

In operation 1303, the read-out mode determining unit 702 sets the first readout mode to the readout mode. For example, as shown in FIG. 11, live-view image signals may be read out by reading out two lines 1101 and 1102 regardless whether the two lines 1101 and 1102 include focus detecting pixels and skipping next two lines 1103 and 1104 in the first readout mode. At the same time, a mode in which focus may be detected by using outputs of focus detecting pixels may be set In operation 1304, the read-out unit 703 reads out the image sensor 708 in the set first mode. Next, the read-out unit 703 detects an increase of Vsync and determines whether read-out of one frame is completed. If an increase of Vsync is detected, the method proceeds to an operation 1305. If not, Vsync may be continuously detected until readout of one frame is completed.

In the operation 1305, live-view images are generated by using image signals read out from the image sensor 708 and the live-view images are displayed.

In an operation 1306, the focus detecting unit 704 according to an embodiment of the disclosure performs a focus detection calculation by using focus detection data read out from focus detecting pixels. Here, since descriptions of image plane phase difference focus detection are given above with reference to FIGS. 2 through 4, detailed descriptions thereof will be omitted.

In an operation 1307, it is determined whether a user is pressing a half-shutter by determining whether a half-shutter signal S1 is low. If the user is not pressing a shutter (half-shutter signal S1 is not low), the method proceeds back to the operation 1304. In other words, the first mode is maintained before a shutter is input, thereby preventing power consumption that occurs in a second mode.

If a half-shutter signal S1 is input from a user, the method proceeds to an operation 1308, in which it is determined whether focus detection may be performed. If focus detection may be performed, the method proceeds to an operation 1312 and a driving communication for driving a focusing lens to a detected focused position is performed.

If focus detection may not be performed, the operation proceeds to an operation 1310, in which brightness of an object is determined. A subroutine for determining brightness of an object will be described below with reference to FIG. 14.

In the operation 1310, the read-out mode determining unit 702 according to an embodiment of the disclosure determines whether brightness of the object is low.

If the brightness of the object is low, the method proceeds to an operation 1311, in which the second mode is set to the readout mode. If the brightness of the object is not low, the method proceeds to A and a lens driving communication is performed.

In an operation 1313, an image sensor is read out in the second mode. Here, it is determined whether readout of one frame of the image sensor is completed by detecting an increase of a Vsync signal. If readout of one frame of the image sensor is completed, the method proceeds to an operation 1314, in which live-view images are generated by using read out image signals and are displayed. If readout of one frame of the image sensor is not completed, it is continuously determined whether readout of one frame of the image sensor is completed. Since descriptions of the second readout mode are given above with reference to FIGS. 9, 10, and 12, detailed descriptions thereof will be omitted here.

In the operation 1314, the image sensor control device 700 generates live-view images by using image signals read out from the image sensor 708 and displays the live-view images.

In an operation 1315, it is determined whether AF is completed. If AF is completed, no further focus detection is necessary, and thus the method proceeds back to the operation 1313, in which live-view images are repeatedly displayed. Here, if a full shutter press signal is input, the image sensor control device 700 may pick up a still image at the completed AF position in response to the full shutter press signal.

If AF is not completed, the method may proceed to an operation 1316, in which the focus detecting unit 704 may perform a focus detection calculation by using read out focus detection data.

In an operation 1317, the focus detecting unit 704 determine whether focus detection may be performed. If focus detection may be performed, the method proceeds to an operation 1318, in which it is determined whether it is focused. If focus detection may not be performed, the method may proceed to an operation 1322.

In the operation 1318, the focus detecting unit 704 determines whether it is focused. If an object is not focused, the focus detecting unit 704 moves a focusing lens to a focused position via a lens driving communication in an operation 1319. If the object is focused, the method proceeds to an operation 1320 and completes AF setup operation. In other words, the focusing lens may be fixed to not to perform any further focus detection.

Next, in an operation 1321, the readout mode is switched back to the first mode. In other words, when an AF setup is completed, it is no longer necessary to perform focus detection, and thus the readout mode is switched to the first mode consuming less power.

In the operation 1322, brightness of an object is determined as in the operation 1309. A subroutine for determining brightness of an object will be described below with reference to FIG. 14.

In an operation 1323, the read-out mode determining unit 702 according to an embodiment of the disclosure determines whether detected brightness of an object is low. If the brightness of the object is low, the method may proceed to an operation 1324, in which charge accumulation times of focus detecting pixels are increased by setting the second readout mode to the readout mode. If the brightness of the object is not low, the method may proceed to an operation 1326, in which the readout mode is switched back to the first mode. The reason of switching the readout mode back to the first readout mode is to prevent errors in focus detection due to saturation of outputs of focus detecting pixels due to increased charge accumulation times.

After a mode is set, the method may proceed back to the operation 1313 and readout of a next frame beings.

Figure 14:
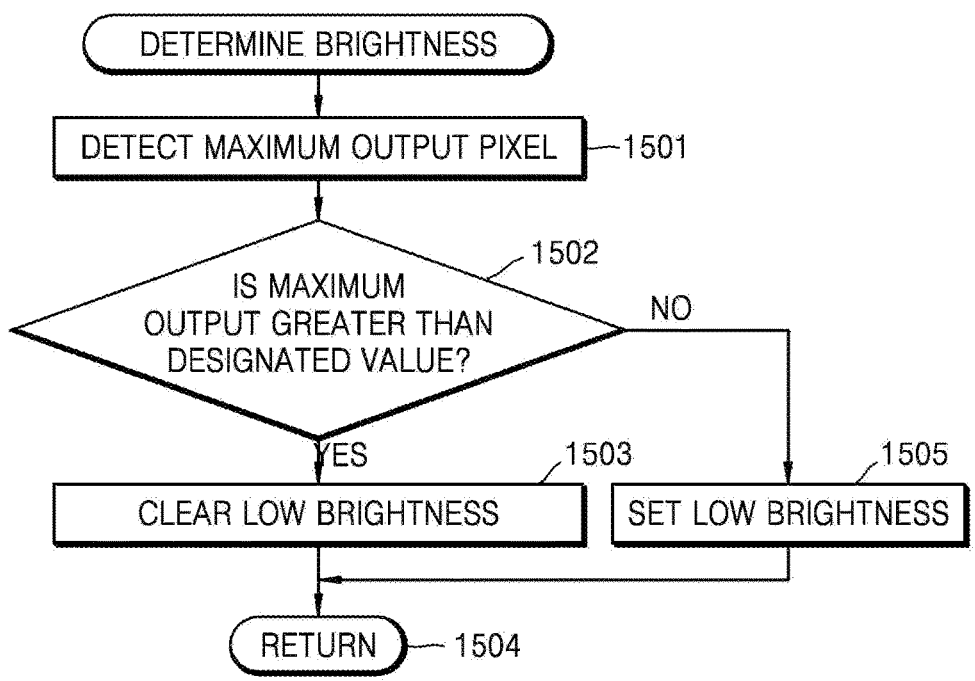
FIG. 14 is a flowchart showing a method of determining whether brightness of an object is low, according to an embodiment.

Meanwhile, FIG. 14 is a flowchart showing a method of determining whether brightness of an object is low, according to an embodiment of the disclosure.

Referring to FIG. 14, in an operation 1501, the object brightness detecting unit 701 according to an embodiment of the disclosure may detect brightness of an object. For example, brightness of an object may be detected by detecting the output of G pixels included in the image sensor 708 during a readout. However, the disclosure is not limited thereto, and any of various methods for detecting brightness of an object may be utilized.

The read-out mode determining unit 702 may determine a readout mode based on the detected brightness of the object.

In an operation 1502, if the detected brightness of the object is equal to or greater than a designated value, the object brightness detecting unit 701 may determine that brightness of the object is normal. On the contrary, if the detected brightness of the object is smaller than or equal to the designated value, the object brightness detecting unit 701 may determine that brightness of the object is low. Here, the designated value may be pre-set to one-fourth of the saturated output of a focus detecting pixel. Therefore, if brightness of the object is low, the method proceeds to an operation 1505 and a low brightness setting is set. If brightness of the object is normal, the method proceeds to an operation 1503 and a low brightness setting is cleared.

Finally, in the operation 1505, a result of determining brightness of the object is returned to 1323 of FIG. 13B.

Therefore, when readout is being performed in the second readout mode, the readout mode is switched back to the first readout mode based on a result of comparing brightness of an object to the designated value, thereby preventing errors in focus detection due to saturation of outputs of focus detecting pixels due to increased charge accumulation times.

As described above, according to the one or more of the above embodiments of the disclosure, an apparatus 700 and a method for controlling exposure time of focus detecting pixels included in an image plane phase difference image sensor according to brightness of an object may be provided.

Therefore, when brightness of an object is normal, live-view display and focus detection may be performed at a high frame rate in the first readout mode. Furthermore, when brightness of an object is low, exposure time of focus detecting pixels may be independently increased in the second readout mode, thereby improving focus detection efficiency while a frame rate of live view display is maintained. Furthermore, the second readout mode may be switched to the first readout mode under pre-set conditions, thereby reducing power consumption.

An apparatus according to various embodiments may include a processor, a memory for storing and executing program data, a permanent storage, such as a disk drive, a user interface device, such as a touch panel, keys, buttons, etc., and so on.

In addition, other embodiments of the disclosure can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to one or more embodiments of the disclosure. The media may also be a distributed network, so that the computer-readable code is stored/transferred and executed in a distributed fashion. Furthermore, the processing element could include a processor or a computer processor, and processing elements may be distributed and/or included in a single device.

Any references, including publications, patent applications, and patents, cited herein are hereby incorporated by reference to the same extent as if each reference were individually and specifically indicated to be incorporated by reference and were set forth in its entirety herein.

To aid in understanding of the disclosure, reference symbols have been used in the embodiments illustrated in the drawings, and particular terminology has been used to describe these embodiments. However, this particular terminology has no intention to limit the scope of the disclosure, and the disclosure should be construed to include all components that would normally occur to those of ordinary skill in the art.

Embodiments of the disclosure may be described in terms of functional blocks and various processing steps. Such functional blocks may be realized by any number of hardware and/or software components configured to perform particular functions. For example, the embodiments of the disclosure may employ various integrated circuit components, such as memory elements, processing elements, logic elements, loop-up tables, etc., that may carry out various functions under the control of one or more microprocessors or other control devices. Similarly, where the components of the embodiments may be implemented using software programming or software elements, the embodiments may be implemented with any programming or scripting language, such as C, C++, Java, assembler, etc., to include various algorithms implemented using any combination of data structures, processes, routines, or other programming elements. Functional aspects may be implemented as algorithms executed by one or more processors. Furthermore, the embodiments of the disclosure may employ related art for electronics configuration, signal processing, data processing, and/or so on. The terms, such as "mechanism," "element," and "configuration," may be used broadly and are not limited to mechanical and physical configurations. The terms may include a series of routines of software in conjunction with a processor and so on.

Particular implementations described in the disclosure are embodiments and are not intended to limit the scope of the disclosure in any way. For the sake of brevity, existing electronics, control systems, software development and other functional aspects of the systems may be omitted. Furthermore, the connecting lines, or connectors between components shown in the figures are intended to present exemplary functional connections and/or physical or circuit connections. In a practical apparatus, a variety of alternative or additional functional connections, physical connections, or circuit connections may be present. Moreover, a component may not be essential to the practice of the disclosure unless the element is specifically described as "essential" or "critical."

The use of the terms "a," "an," "the," and similar referents in this disclosure (especially in the claims) may be construed to cover both the singular and the plural. Furthermore, recitation of ranges of values herein are merely intended to serve as a shorthand method of referring individually to each separate value falling within the range (unless otherwise indicated herein), and each separate value is incorporated into the specification as if it were individually recited herein. Finally, the steps of a method described herein may be performed in any suitable order unless otherwise indicated herein or otherwise clearly contradicted by context. The disclosure is not limited to the described order of the steps. The use of any and all examples, or exemplary terms (e.g., such as) provided herein is intended merely to describe and does not pose a limitation on the scope of the disclosure unless otherwise claimed. Numerous modifications, combinations, and changes according to design conditions and factors will be apparent to those of ordinary skill in the art within the scope of the following claims or equivalents thereof.

What is claimed is:

1. An image sensor control device comprising:
   an image sensor including a pixel matrix having focus detecting pixels and non-focus detecting pixels, wherein the pixel matrix has a first type of line including non-focus detecting pixels only and a second type of line including focus detecting pixels and non-focus detecting pixels;
   an object brightness detecting unit that detects brightness of an object;
   a mode determining unit that determines a first readout mode or a second readout mode based on the detected brightness of the object;
   a read-out unit that selectively reads out designated lines of the pixel matrix in the determined readout mode; and
   a focus detecting unit that performs focus detection by using focus detection data read out from the focus detecting pixels,
   wherein, in the first readout mode, the read-out unit selects designated second type of lines and reads out the pixels in a first interval to generate a live view and to perform auto focus, and,
   in the second readout mode, the read-out unit selects designated first type of lines in the first interval to read out the non-focus detecting pixels to output the live view, and selects designated second type of lines in a second interval to read out the focus detecting pixels to perform auto focus, wherein the second interval is longer than the first interval.

2. The image sensor control device of claim 1, further comprising:
   a correcting unit, which corrects an output of the focus detecting pixel with an image signal output of a pixel adjacent to the focus detecting pixel; and
   an image generating unit, which generates live-view images by using the read out image signals.

3. The image sensor control device of claim 1, wherein the first interval is one frame cycle of live-view images.

4. The image sensor control device of claim 1, wherein the mode determining unit determines whether a half-shutter signal is input by a user,
   if the half-shutter signal is not input, the mode determining unit determines the first readout mode as the readout mode, and
   if the half-shutter signal is input, the mode determining unit determines the readout mode based on the determined brightness of the object.

5. The image sensor control device of claim 1, wherein, if it is determined that it is unable to perform focus detection based on focus detection data read out from the focus detecting pixels, the mode determining unit determines the second readout mode as the readout mode.

6. The image sensor control device of claim 1, wherein the mode determining unit further comprises a brightness determining unit, which determines that, if the brightness of the object is smaller than or equal to a designated value, the brightness of the object is low, and
   if it is determined that the brightness of the object is low, the mode determining unit determines the second readout mode as the readout mode.

7. The image sensor control device of claim 6, wherein the designated value is determined based on the saturated output of the focus detecting pixel.

8. A method of controlling an image sensor including a pixel matrix having focus detecting pixels and non-focus-detecting pixels, the method comprising:
   detecting brightness of an object;
   determining a readout mode based on the detected brightness of the object;

selectively reading out designated lines of the pixel matrix in the determined readout mode, wherein the pixel matrix has a first type of line including non-focus detecting pixels only and a second type of line including focus detecting pixels and non-focus detecting pixels; and performing focus detection by using focus detection data read out from the focus detecting pixels, wherein, in the first readout mode, the read-out unit selects designated second type of lines and reads out the pixels in a first interval to generate a live view and to perform auto focus, and, in the second readout mode, the readout unit selects designated first type of lines in the first interval to read out the non-focus detecting pixels to output the live view, and selects designated second type of lines in a second interval to read out the focus detecting pixels to perform AF, wherein the second interval is longer than the first interval.

9. The method of claim 8, wherein the determining of the readout mode comprises:

determining whether a half-shutter signal is input by a user;

if the half-shutter signal is not input, determining the first readout mode as the readout mode; and, if the half-shutter signal is input, determining the readout mode based on the determined brightness of the object.

10. The method of claim 8, wherein the determining of the readout mode comprises:

if it is determined that it is unable to perform focus detection based on focus detection data read out from the focus detecting pixels, determining the second readout mode as the readout mode.

11. The method of claim 8, wherein the determining of the readout mode comprises:

if the brightness of the object is smaller than or equal to a designated value, determining that the brightness of the object is low, and if it is determined that the brightness of the object is low, determining the second readout mode as the readout mode.

12. A non-transitory computer readable recording medium having recorded thereon a computer program for carrying out a method comprising:

detecting brightness of an object;

determining a readout mode based on the detected brightness of the object;

selectively reading out designated lines of a pixel matrix having focus detecting pixels and non focus-detecting pixels in the determined readout mode, wherein the pixel matrix has a first type of line including non-focus detecting pixels only and a second type of line including focus detecting pixels and non-focus detecting pixels; and performing focus detection by using focus detection data read out from the focus detecting pixels, wherein, in the first readout mode, the read-out unit selects designated second type of lines and reads out the pixels in a first interval to generate a live view and to perform auto focus, and, in the second readout mode, the read-out unit selects designated first type of lines in the first interval to read out the non-focus detecting pixels to output the live view, and selects designated second type of lines in a second interval to read out the focus detecting pixels to perform auto focus, wherein the second interval is longer than the first interval.

* * * * *